United States Patent
Bailey et al.

(10) Patent No.: US 10,860,902 B2
(45) Date of Patent: Dec. 8, 2020

(54) MOVABLE CARD FOR CLEANING PRINTED MEDIA TRANSPORT SYSTEM AND METHOD OF USING SAME

(71) Applicant: KICTeam, Inc., Auburn, ME (US)

(72) Inventors: Glen Bailey, Litchfield, ME (US); Geoffrey Scott Caron, Sabattus, ME (US); Ian McCormick, Yarmouth, ME (US); John Condon, Summer, ME (US); Byron Mehl Kern, II, Cumberland Foreside, ME (US); Kenneth Monroe Pedersen, III, Auburn, ME (US)

(73) Assignee: KICTEAM, INC., Auburn, ME (US)

( * ) Notice: Subject to any disclaimer, the term of this patent is extended or adjusted under 35 U.S.C. 154(b) by 119 days.

(21) Appl. No.: 16/140,747

(22) Filed: Sep. 25, 2018

(65) Prior Publication Data

US 2019/0095767 A1    Mar. 28, 2019

Related U.S. Application Data (60) Provisional application No. 62/567,796, filed on Oct. 4, 2017, provisional application No. 62/562,640, filed on Sep. 25, 2017.

(51) Int. Cl.
*G06K 13/08* (2006.01)
*B41J 29/17* (2006.01)
(Continued)

(52) U.S. Cl.
CPC .......... *G06K 13/0868* (2013.01); *B08B 1/001* (2013.01); *B08B 1/02* (2013.01); *B41J 29/17* (2013.01); *G06K 13/04* (2013.01)

(58) Field of Classification Search
CPC .... G06K 13/0868; G06K 13/04; B08B 1/001; B08B 1/02; B41J 29/17
See application file for complete search history.

(56) References Cited

U.S. PATENT DOCUMENTS 5,153,964 A    10/1992   Gelardi et al.
5,861,614 A    1/1999    Gardner
(Continued)

FOREIGN PATENT DOCUMENTS

JP    H01205391 A    8/1989
JP    2000148940 A   5/2000
(Continued)

OTHER PUBLICATIONS

JP2003146466; Kamoda, S.; machine translation (Year: 2003).*
(Continued)

*Primary Examiner* — Mikhail Kornakov
*Assistant Examiner* — Natasha N Campbell
(74) *Attorney, Agent, or Firm* — Fox Rothschild LLP (57) ABSTRACT

A system for cleaning a media transport device includes a cleaning substrate sized and configured to fit within at least a portion of a media travel pathway of the transport device. The cleaning substrate includes scarifying holes that scrape debris from media conveyors (belts and/or rollers) of the transport device. Cleaning the transport device may include positioning the cleaning substrate in the section while operating the transport device, or moving the substrate so that the scarifying holes contact the cleaning substrate and clean the belts and/or rollers.

27 Claims, 10 Drawing Sheets

(51) Int. Cl.
*G06K 13/04* (2006.01)
*B08B 1/00* (2006.01)
*B08B 1/02* (2006.01)

(56) References Cited

U.S. PATENT DOCUMENTS

| | | | |
|---|---|---|---|
| 6,156,407 | A | 12/2000 | Neubauer et al. |
| 6,243,908 | B1 | 6/2001 | Battle et al. |
| 6,611,985 | B1 | 9/2003 | Neubauer et al. |
| 7,077,315 | B2 | 7/2006 | McCance |
| 7,540,055 | B1 | 6/2009 | Bailey |
| 7,846,534 | B2 | 12/2010 | Bouchard et al. |
| 8,323,779 | B2 | 12/2012 | Bailey et al. |
| 2005/0210610 | A1 | 9/2005 | Louie et al. |
| 2010/0119765 | A1 | 5/2010 | Kabis et al. |

FOREIGN PATENT DOCUMENTS

| | | | |
|---|---|---|---|
| JP | 2001067631 | A | 3/2001 |
| JP | 2001344637 | A | 12/2001 |
| JP | 2002025022 | A | 1/2002 |
| JP | 2003146466 | A * | 5/2003 |
| JP | 2004102740 | A | 4/2004 |
| JP | 2013020572 | A | 1/2013 |
| WO | 2007016512 | A2 | 2/2007 |

OTHER PUBLICATIONS

IDP Smart Card Printers Cleaning. ID Card Systems, Inc. Oct. 31, 2014 [online] Retrieved from Internet: Mar. 6, 2019, https://www.youtube.com/watch?v=VfRR8G0wDKA.

Encoded ATM CLeaning Card Product Detail Page; http://www.kicteam.com/en/K2_HEB10; accessed Spe. 21, 2017.

Advanced cleaning wizard: Instering a "T" card and adhesive card [US]; http://us.evolis.com/primacy-982-advanced-cleaning-wizard-instering-t-card-adhesive-card-us; accessed Sep. 21, 2017.

* cited by examiner

MOVABLE CARD FOR CLEANING PRINTED MEDIA TRANSPORT SYSTEM AND METHOD OF USING SAME

RELATED APPLICATIONS AND CLAIM OF PRIORITY

This patent document claims priority to: (1) U.S. provisional patent application No. 62/562,640, filed Sep. 25, 2017; and (2) U.S. provisional patent application No. 62/567,796, filed Oct. 4, 2017. The disclosure of each priority document is fully incorporated into this document by reference.

BACKGROUND

Many machines have media transport mechanisms that receive printed media into the machine and move the media through one or more sections of the machine to perform various processes on the media. For example, a financial transaction terminal such as an automated teller machine may do any or all of the following steps: (i) receive printed currency notes, checks, receipts, coupons, tickets and other printed media; (ii) align the media to an internal reference; (iii) use a camera and/or other sensors to detect what the media is and/or what is printed on the media; (iv) apply additional printed markings to the media; and/or (v) move the media to an appropriate shuttle, bin or exit port. The terminal may perform some or all of these steps, and/or additional steps. Other machines that include media transport mechanisms include coupon printers, ticket printers, ticket-taking devices and other printed media handling systems.

Because printed media can pass through a variety of human hands and environmental conditions before it is inserted into a media transport mechanism, printed media often is at least partially coated with dirt, oil and/or other contaminants. When the printed media passes through the media transport mechanism, the contaminants can transfer from the printed media to the mechanism's rollers, belts, other conveyors, and other components that contact the printed media. Over time, these contaminants can build up and cause the machine to malfunction.

The removal of contaminants from a media transport mechanism is a labor-intensive and, time-consuming process. It requires a technician to open the device and carefully clean small parts by hand. Many of these parts are in small, hard-to-reach spaces. Thus, manual cleaning is difficult, and it is not always effective.

This document describes methods and systems directed to solving some of the issues described above, and/or other issues.

SUMMARY

A system for cleaning a media transport device includes a cleaning substrate sized and configured to fit within at least a portion of a media travel pathway of the transport device. The cleaning substrate includes scarifying holes that scrape debris from media conveyors (belts and/or rollers) of the transport device, and optionally flaps that can fit under belts of the transport device. Cleaning the transport device includes positioning the cleaning substrate in the section, and operating the transport device and/or moving the substrate so that the scarifying holes (and flaps if available) contact the cleaning substrate and clean the belts and/or rollers.

In some embodiments, a card containing features such as those above may be moved through some or all sections of the media transport device during cleaning.

In another aspect, a cleaning system for cleaning a currency transport device includes a cleaning substrate sized and configured to be insert within at least a portion of a media travel pathway of a currency transport device. The cleaning substrate includes a cleaning face. Scarifying holes are positioned on the cleaning face. Each of the scarifying holes is positioned to align with a belt, a drive roller, an idle roller, or a drive roller/idle roller pair of the currency transport device when the cleaning substrate is within the media travel pathway.

Optionally, the cleaning substrate may include one or more scrapers, each of which is attached to at least one edge of one of the scarifying holes and extends inwardly from the edge(s) and toward the center of that scarifying hole. Optionally, the cleaning substrate may include flaps configured to fit under a plurality of belts of the currency transport device. Optionally, cleaning substrate may include at least one opening configured to align with a sensor of the currency transport device. The opening may be a hole, or it may be a transparent material so that the media sensor does not detect the substrate when the opening is positioned over the media sensor. Optionally, a cleaning solution may be disposed on at least a portion of the cleaning face of the cleaning substrate.

Optionally, the cleaning substrate may include a handle that is positioned to remain outside of the currency transport device while the cleaning face is within the currency transport device. For example, the handle may be positioned to extend through a currency acceptor port of the currency transport device. Or, the handle may be positioned to extend from a port that is not a currency acceptor port of the currency transport device.

In another embodiment, a method of cleaning a media travel pathway of a media transport device includes accessing at least a first section of a media travel pathway of a media transport device. The media travel pathway includes media conveyors with belts, rollers or both. The method includes inserting at least a portion of a cleaning substrate in the first section. The cleaning substrate includes a cleaning face and scarifying holes, each of which is positioned to align with one or more of the media conveyors. The method includes moving the cleaning substrate within the media transport device and causing, by the moving, the scarifying holes to contact and clean a plurality of the media conveyors within the first section of the media transport device.

Optionally, the cleaning substrate may include one or more flaps configured to fit under one or more belts of the currency transport device, and if so then moving the cleaning substrate within the media transport device also may cause the one or more flaps to contact and clean one or more of the belts. Optionally, the cleaning substrate may include one or more scrapers, each of which is attached to at least one edge of one of the scarifying holes and extends inwardly from the at least one edge toward the center of that scarifying hole, and if so then moving the cleaning substrate within the media transport device also may cause the one or more scrapers to contact and clean one or more of the media conveyors.

Optionally, inserting at least a portion of the cleaning substrate in the first section may include grasping a handle of the cleaning substrate and inserting a body of the cleaning substrate into a portal of the media transport device, Moving the cleaning substrate within the media transport device may then include moving the body through a range of positions within the first section to cause the scarifying holes to clean a plurality of the media conveyors over the range of positions.

Optionally, moving the cleaning substrate within the media transport device may include operating a motor of the media transport device so that the cleaning substrate moves through a range of positions within the first section to cause the scarifying holes to clean a plurality of the media conveyors over the range of positions.

Optionally, inserting at least a portion of the cleaning substrate in the first section may include inserting a cleaning surface that includes the scarifying holes through a media acceptor port of the media transport device while holding a handle of the cleaning substrate outside of the media transport device. If so, then moving the cleaning substrate within the media transport device may be caused by wiggling the handle outside of the media transport device.

Optionally, inserting at least a portion of the cleaning substrate in the first section may include opening a module that forms the media travel pathway and inserting a cleaning surface that includes the scarifying holes into the module while holding a handle of the cleaning substrate outside of the module.

Optionally, the system may include a scroll. The scroll includes a roller around which the cleaning substrate is wound, a retraction mechanism and a clutch. Moving the cleaning substrate within the media transport device may include extending the cleaning substrate from the scroll. The method may further include withdrawing the cleaning substrate from the media transport device by releasing the clutch and retracting the cleaning substrate into the scroll.

In some embodiments, a method of cleaning a media travel pathway of a media transport device includes operating a first section of a media travel pathway of a media transport device and a second section of the media transport device. Each section includes media conveyors that comprise belts, rollers or both. The method includes inserting at least a portion of a cleaning substrate in the first section. The cleaning substrate includes a cleaning face and scarifying holes that are positioned to align with one or more of the media conveyors. The method includes continuing to operate the media transport device and causing, by the operating, at least some of the scarifying holes to contact and clean at least some of the media conveyors within the first section of the media transport device. The media transport device will then move the cleaning substrate to the second section. The media device will continue to be operated, which will cause at least some of the scarifying holes to contact and clean the media conveyors within the second section of the media transport device.

Optionally, the media transport device may detect that the portion of the cleaning substrate was inserted into the first section. If so, then in response to the detecting, the media transport device may initiate a cleaning mode of the media transport device so that the operating of the media transport device occurs in the cleaning mode. Also optionally, the media transport device may detect that the cleaning substrate has achieved a threshold level of cleaning in the first section, and in response it may initiate the moving to the second section. If the cleaning substrate is connected to a scroll, then when the media transport device is operated the cleaning substrate is extended from the scroll, and when the media transport device is stopped and the clutch of the scroll is released, the cleaning substrate may be withdrawn from the media transport device and retracted into the scroll.

In some embodiments, a cleaning system for cleaning a currency transport device includes a cleaning substrate sized and configured to be inserted within at least a portion of a media travel pathway of a currency transport device. The cleaning substrate includes a length of cleaning material. The system also includes a scroll that includes: (i) a roller around which a portion of the cleaning substrate is wrapped; (ii) a housing having an opening through which a portion of the cleaning substrate may extend; (iii) a retraction mechanism; and (iv) a clutch that, when released while the cleaning material is extended, will cause the cleaning substrate to retract into the housing. The cleaning substrate may include a cleaning face and scarifying holes positioned on the cleaning face. Each of the scarifying holes may be positioned to align with a belt, a drive roller, an idle roller, or a drive roller/idle roller pair of the currency transport device when the cleaning substrate is within the media travel pathway.

DETAILED DESCRIPTION

In this document, the singular forms "a," "an," and "the" include plural references unless the context clearly dictates otherwise. The term "comprising" means "including, but not limited to." Similarly, the term "comprises" means "includes, and is not limited to." Unless defined otherwise, all technical and scientific terms used in this document have the same meanings as commonly understood by one of ordinary skill in the art.

In this document, terms that are descriptive of position such as "upper" and "lower", "horizontal", "vertical" and the like are intended to indicate relative positions with respect to the components for which those terms are descriptive, and are not intended to be absolute and require that the component remain in that absolute position in all configurations. Except where specifically stated otherwise, numeric descriptors such as "first", "second", etc. are not intended to designate a particular order, sequence or position in an overall process or schema, but instead are simply intended to distinguish various items from each other by describing them as a first item, a second item, etc.

The terms "media transport system" and "media transport device" refer to a set of hardware components that are configured to receive printed media (i.e., a substrate onto which text and/or graphics have been printed) and move the printed media through one or more modules that perform various processing steps on the printed media, such as position adjustment, sensing, printing and/or delivery to a final destination. A "currency transport device" or "currency transport system" is a type of media transport device that is configured to process and convey printed financial instruments such as currency notes, checks, money orders, bank notes and the like.

Figure 1A:
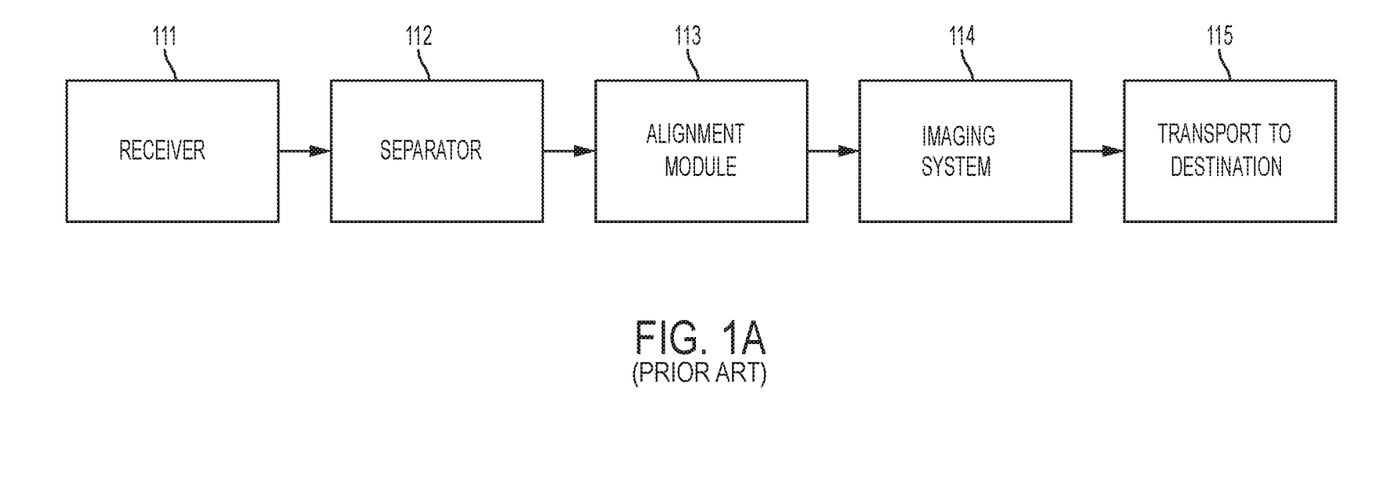
FIG. 1A illustrates example components of a media transport system, such as may exist in a prior art automated teller machine or ticket taking machine, in block diagram format.
Figure 1B:
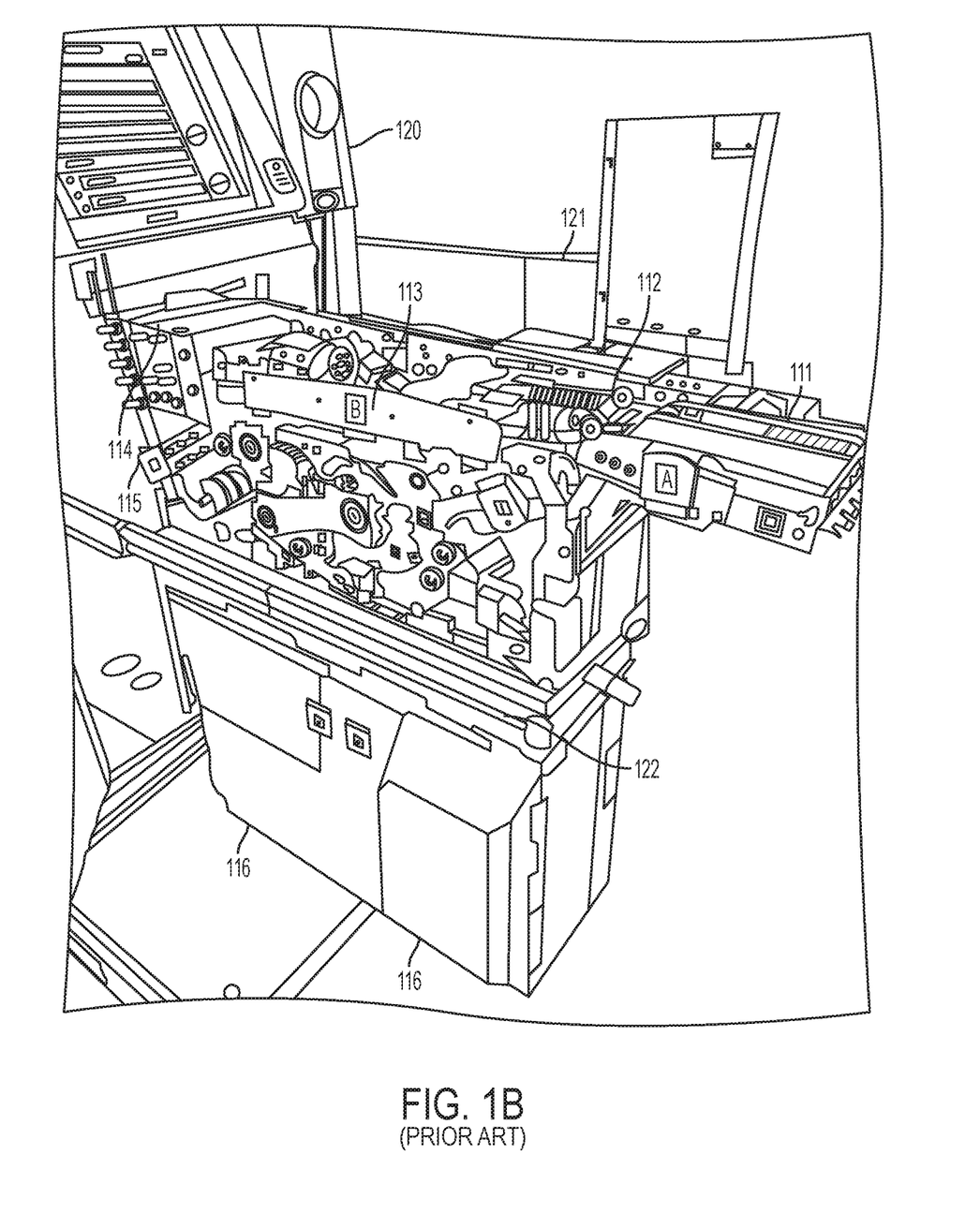
FIG. 1B illustrates an example of an automated teller machine that includes the components shown in FIG. 1A.

FIG. 1A is a block diagram that illustrates example components of a media transport system, such as may exist in a prior art automated teller machine or ticket taking machine. FIG. 1B illustrates an example of an automated teller machine that includes the components shown in FIG. 1A. The machine includes a housing 120 that contains the media transport system. As shown in FIG. 1B, optionally the housing may include a door 121 and one or more extendible rails 122, shuttles, or other movable mechanisms that may be used to remove at least part of the media transport system from the housing 120.

The media transport system includes components such as a receiver 111 that includes belts, rollers or other conveying mechanisms that will receive printed media into the system via an opening in the housing. The media transport system also may include a separator module 112 that includes belts, rollers or other media conveyor devices that separate stacked printed media, such as stacked checks or currency notes. In currency transport systems, such rollers are sometimes referred to as "pick rollers" or "pick wheels." The media transport system also may include an alignment module 113 that includes belts, rollers or other conveying mechanisms that will adjust a position of the media with respect to an internal reference point. The media transport system also may include an imaging system 114 with a camera and/or other sensors and associated programming that can detect what the media is and/or what is printed on the media. The media transport system also may include a transport module 115 with one or more belts, rollers or other media conveyors that will move the printed media to an appropriate destination 116 such as a shuttle, bin or exit port. The media transport system also may include other modules, such as a printer that can apply additional printed markings to the printed media. The areas within each module through which the printed media passes form a media travel pathway from the receiver's intake to the final destination.

Figure 2:
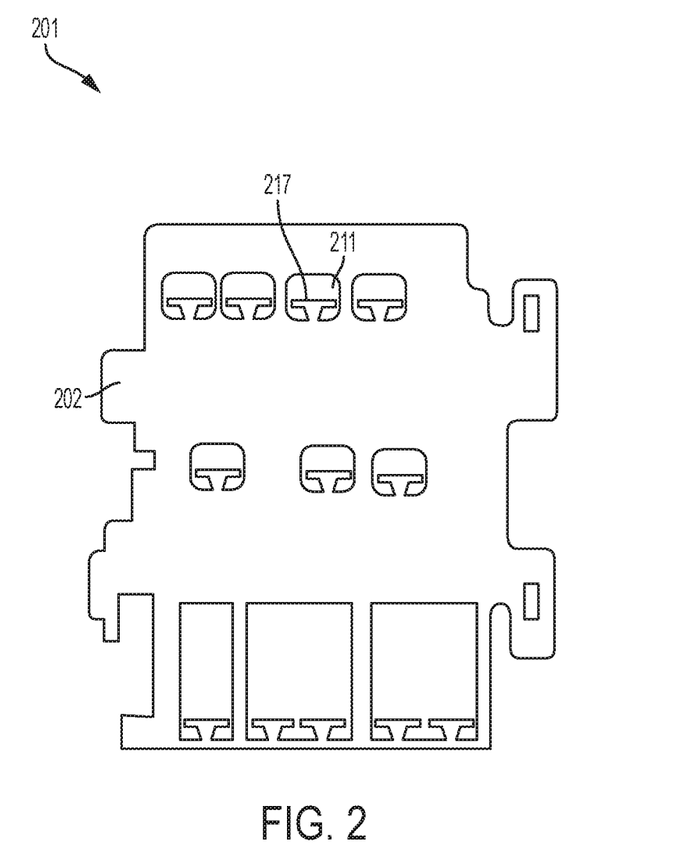
FIG. 2 illustrates a first example configuration of a cleaning substrate with scarifying holes.

FIG. 2 illustrates an example of a cleaning system that includes a cleaning substrate 201, which sometimes may be referred to as a cleaning card, that may be used to clean various components of a media transport system such as that shown in FIGS. 1A and 1B. The cleaning substrate includes a cleaning face 202 (which as shown is an upper face) and an opposing face (not shown, since it is under cleaning face 202) that may or may not also be a cleaning face. At least one of the cleaning faces may be coated with a cleaning solution such as a solvent so that internal components of the media transport system may be cleaned when the components move along or across the cleaning face of the substrate. Example cleaning solutions include isopropyl alcohol, deionized water, alkaline surfactants, and other materials or combinations of these. Alternatively, a cleaning face may be textured or made of fiber that will promote friction when a movable object is moved against the cleaning face. The cleaning substrate may be made of a flexible, tear-resistant material such as a fibrous aramid or meta-aramid fabric material such as that marketed under the NOMEX® brand; a cellulosic material; a flexible polymeric substrate provided with thin, non-woven layers made of absorbent material such as that marketed under the SONTARA® brand; a sponge made of polyurethane or other type of foam; or a combination of any of these, such as a sponge coated with a fabric, non-woven absorbent or cellulosic material.

Figure 3:
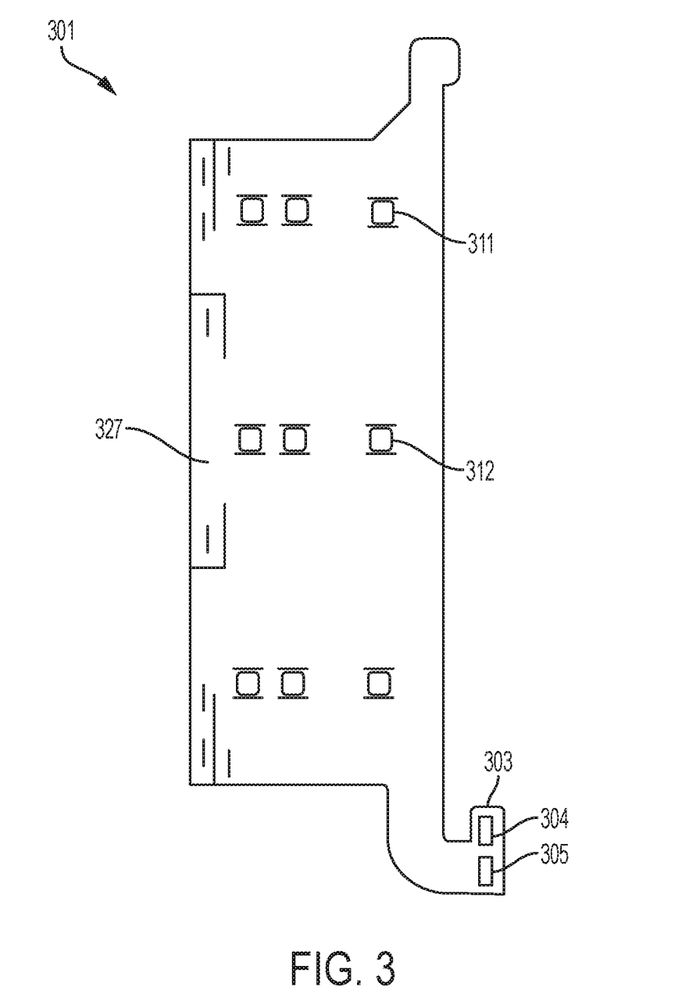
FIG. 3 illustrates another example configuration of a cleaning substrate with scarifying holes and a locking member.

At least a portion of the cleaning substrate has a length and width that is sized and shaped to fit within the media travel pathway of the transport device with which the cleaning substrate is intended to be used. As used in this document, the term "fit within" does not necessarily mean that the substrate is entirely held within the media travel pathway, as a handle or other extension of the substrate may extend from the media travel pathway outside of the transport device so that a person can hold and move it into and out of the device. An example is handle 317 as shown in FIG. 3, as well as the handles such as are generally known on "T-cards" that have a handle portion that is wider than an insertable portion. However, in some optional embodiments the cleaning substrate will be retained completely within the media travel pathway. In some optional embodiments, no portion of the substrate will extend from a media acceptor port (such as a currency acceptor slot) of the transport device.

Figure 4:
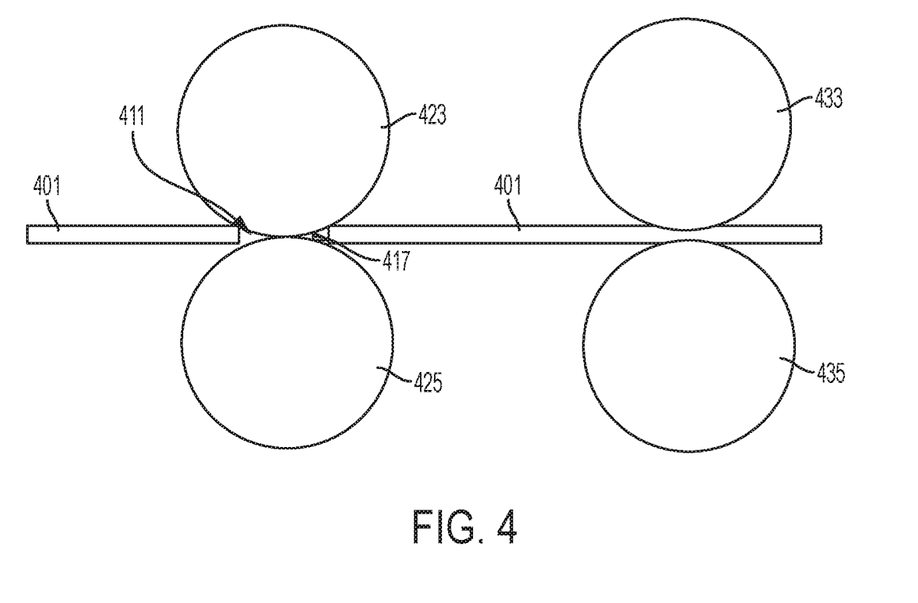
FIG. 4 illustrates a process by which a cleaning substrate may clean rollers of a media transport system.

In addition, referring to FIG. 3, the cleaning substrate will include multiple scarifying holes 312, 313 that are positioned to align over, under, or in between rollers of the media transport device. A scarifying hole is an opening created and positioned to provide a scraping edge against which another item may be scraped so that debris or other contaminants on the item's surface are scraped and thus removed via movement of the scarifying hole, the item or both. Referring to FIG. 4, the substrate 401 includes a scarifying hole 411 sized and positioned to fit between an idle roller 423 and drive roller 425 of the media transport system. In normal operation when the media transport system receives printed media, the drive roller 425 presses against the media, and a motor turns the drive roller 425 to move the media through the media travel pathway. The idle roller 423 is positioned proximate to the drive roller 425 to serve as a backstop for the force of the drive roller 425. The printed media passes between the idle roller 423 and drive roller 425. In a cleaning operation, the drive roller 425 is activated but the cleaning substrate remains stationary, anchored in the transport path by the locking structure(s). The scarifying hole 411 receives the idle roller 423 and/or the drive roller 425 so that one or both rollers scrape along the edges of the scarifying hole 411 and are thus cleaned. In configurations that only use a drive roller without an idle roller, the drive roller may be received into the scarifying hole.

The drive rollers and/or idle rollers of other drive roller 435/idle roller 433 pairs that are not aligned with the scarifying hole 411 will be wiped by the cleaning substrate. Then, when the cleaning substrate is moved to a different position in the media transport path (and a different locking member receptacle or media transport system post is used to lock the cleaning substrate in the different position) the other drive roller 435/idle roller 433 pair may be aligned with the scarifying hole 411 or a different scarifying hole in the substrate.

Scarifying holes also may be sized and positioned to align with and accept one or more belts or other moving parts of the media travel pathway. For example, referring to FIG. 5, one or more axles 522, when activated, turn a belt 525 while the cleaning substrate is positioned within the media travel pathway. If the scarifying hole has a width that smaller than, or at least no greater than, the width of the belt 525, the belt 525 will be scraped by the scarifying hole 511 and wiped by the cleaning substrate 501. In addition, if the scarifying hole 511 is positioned to align with the axle 522, the axle 522 may help push a segment of the belt 525 into the scarifying hole 511 to promote scraping of the belt 525 along the edge of the scarifying hole 511.

Figure 5:
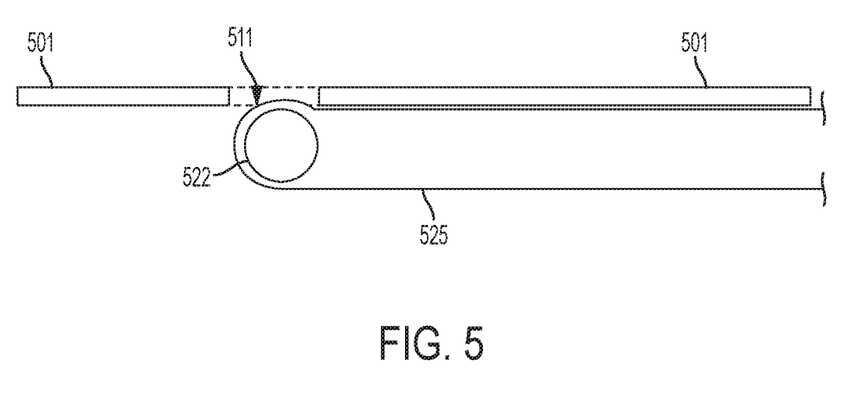
FIG. 5 illustrates a process by which a cleaning substrate may clean a belt of a media transport system.
Figure 6:
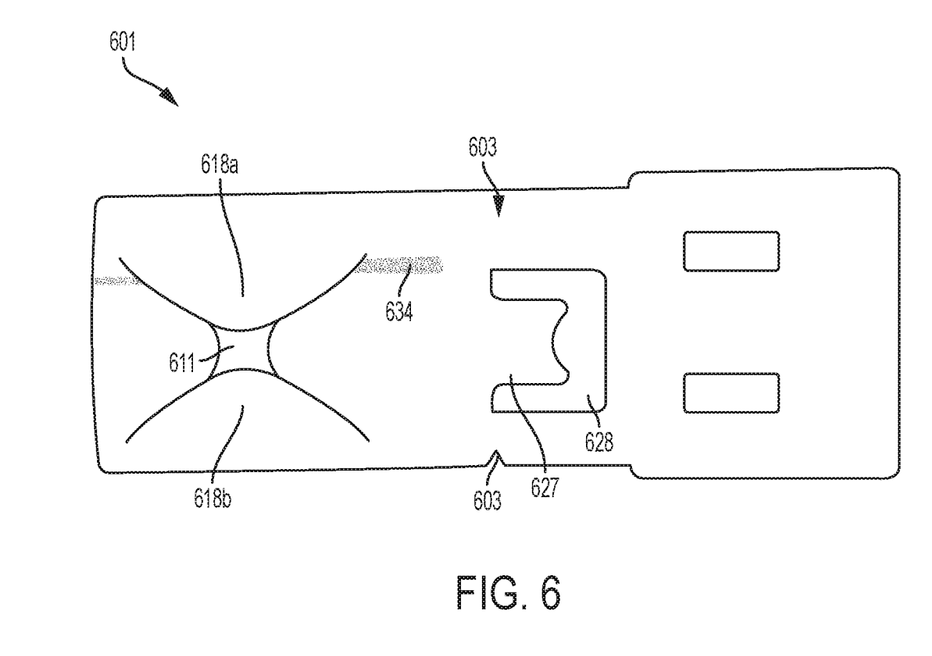
FIG. 6 illustrates another example configuration of a cleaning substrate, with flaps for use in cleaning a belt. This embodiment also includes a handle that may be used to move the card while the card is within a media travel pathway.

FIG. 6 illustrates an alternative to FIG. 5 in which, as an alternative to (or in addition to) a scarifying hole, a belt scraper is formed by one or more inwardly-facing flaps 618a, 618b that may be lifted upward, pressed downward, or otherwise moved so that the belt may be positioned under or over each flap. Each flap 618a, 618b will have at least one side that is attached to the cleaning substrate and at least one edge that is cut away from the substrate so that it can be lifted or pressed and receive the belt. The edge may be a single curved edge as shown, or multiple angled edges may be used. As the belt is operated, the cut-away edge of the flap will scrape the belt. The face of the cleaning substrate also may wipe the belt. In addition, both sides of the belt may brush across the cleaning surface of the substrate and the flap as the belt passes over the substrate and under the flap (or over the flap and under the substrate). This may result in the deposit of dirt, oil or other contaminants 634 on the cleaning substrate, as shown in FIG. 6. Optionally, the flaps 618a, 618b may be adjacent to a scarifying hole 611. In some embodiments, the flaps 618a, 618b may hold the cleaning substrate in a position by contact with the belts during operation.

The embodiment of FIG. 6 also illustrates an embodiment with a handle 617 for grasping while inserting a body 613 of the substrate into the media transport device. The handle 617 is positioned so that it will remain outside of the media transport device whole the body 613, which include a cleaning surface, is within the media transport device. In some embodiments the handle 617 may extend from the currency acceptor port (or other media acceptor port) of the device when in use. In other embodiments, the handle 617 may extend from a portal that is not a media acceptor port (such as the portals discussed below in the context of FIG. 8. The handle 617 can also be used to move the body 613 inward and outward, and optionally to wiggle the card from side to side, to move the body over a range of positions. The addition of a handle is not limited to the embodiment of FIG. 6; other embodiments (such as embodiments with scarifying holes but no flaps) may include a handle.

Figure 7:
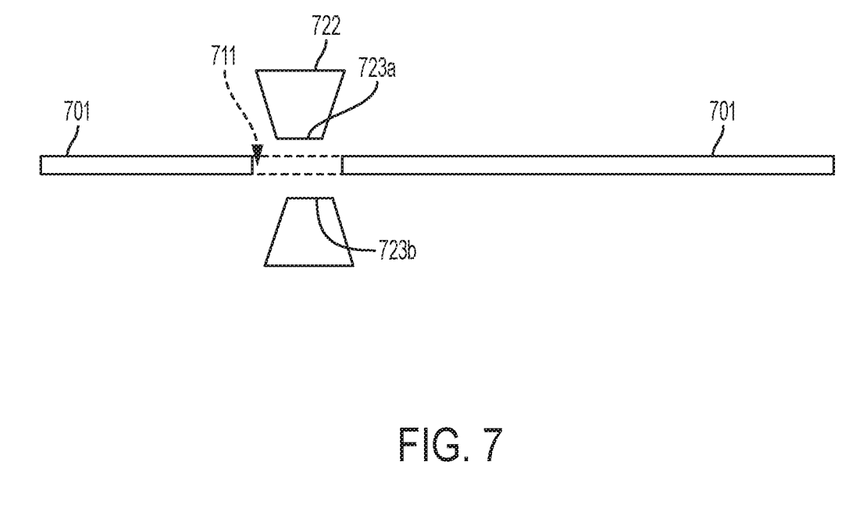
FIG. 7 illustrates how sensors may be used with a cleaning substrate.

Referring to FIG. 7, in some embodiments scarifying holes or other holes 711 of the cleaning substrate 701 also may be sized and positioned to align with one or more sensors 722 within the media travel pathway. Such a sensor 722 may include a pressure sensor, an optical sensor, a temperature sensor, and/or any other sensor that is available in the media transport system and may, in some embodiments, include a transmitter 723a and receiver 723b as is shown in FIG. 7. The media transport device may use the sensor 722 to detect the position of the cleaning substrate 701 within the media travel pathway (e.g., based on pressure or optical data determine whether the sensor is over a scarifying hole). In addition, in some media transport systems one or more sensors 722 may be used to detect and issue an alert indicating whether the device is jammed and media is not moving through the media travel pathway; if so, the placement of a scarifying hole 711 or other opening under such a sensor can help avoid the media transport system stopping. Instead of a hole, the opening may be a transparent material so that the media sensor does not detect the substrate when the opening is positioned over the media sensor. The system knows that the cleaning substrate is in proper position when it detects the hole because if the hole 711 or opening not been positioned under the sensor 722, the sensor 722 would have detected the presence of the non-moving substrate and thus detected that the cleaning substrate is not moving through the device. Optionally, the sensor 722 also may be used to alert an operator that he or she has placed the cleaning substrate in a proper position may be cleaned. For example, when the sensor 722 detects a hole, it may cause a user interface associated with the media output device to output an audible or visual alert indicating that the cleaning substrate is in a proper cleaning position, but if the sensor 722 does not detect a hole it may cause the user interface to output an alert indicating that the cleaning substrate is not in a proper cleaning position.

Referring back to FIG. 2, in some embodiments one or more of the scarifying holes 211 may include a scraper 217 that is attached to one or more edges of the scarifying hole. The scraper 217 extends inwardly toward the center of the scarifying hole 211. Referring to FIG. 4, depending on whether the alignment of the scraper 417 is positioned closer to an upper face, closer to a lower face, or centrally within the scarifying hole, the scraper may provide additional scraping force against the idle roller 423 and/or the drive roller 425.

In any of the embodiments described above, the cleaning face(s) of the cleaning substrate may be textured to provide additional cleaning function (e.g., by applying friction to belts that pass over the cleaning substrate). The cleaning face(s) also may include a material such as a meshed loop structure that entangles dirt to trap it.

Figure 8:
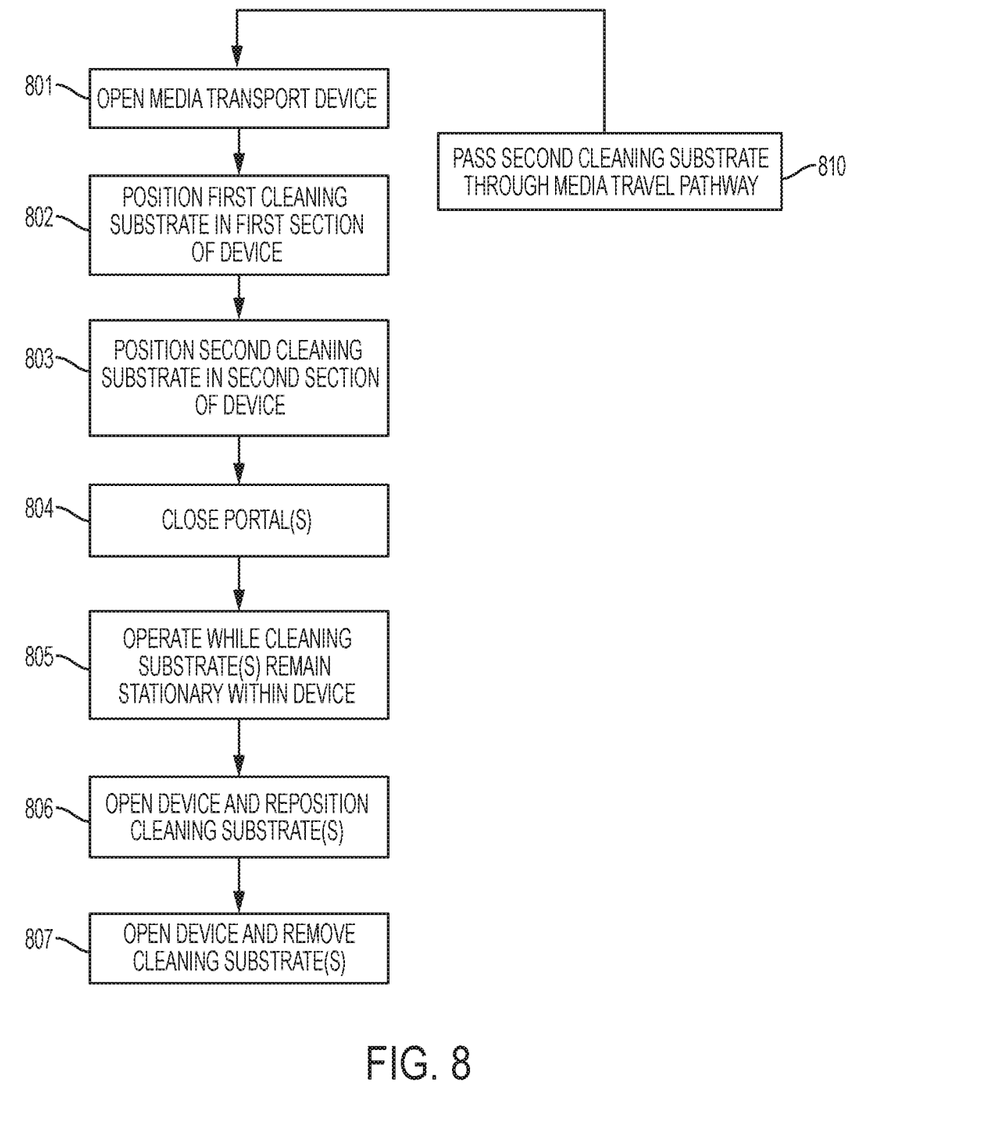
FIG. 8 is a flow diagram illustrating a method of using a cleaning system of a type consistent with that shown by way of example in FIGS. 2-7.

FIG. 8 further illustrates a method of using a cleaning system such as that described above. The method includes accessing the media transport device via a portal into which a first cleaning substrate may be placed (step 801). Optionally, the portal may be a portal that is not accessible during normal operation of the device. For example, the portal may not be a currency acceptor slot that is used during normal operation to insert currency into the media transport device. Instead, the portal will be formed by opening one or more of the modules that form the media travel pathway. Alternatively, the substrate may be partially or fully inserted through the currency acceptor slot or other portal. The cleaning substrate will be inserted into a media travel pathway of the media transport device through the portal. The cleaning substrate may be placed into position with or without operating the motor that actuates the media conveyors (i.e., belts and/or rollers) of the media transport device (step 802).

In some embodiments, the media transport device may detect that a cleaning substrate has been placed into the media travel pathway, and if so it may automatically change its mode of operation to a cleaning mode rather than a normal operating mode. The cleaning mode may differ from the normal mode in that, for example, it may hold the cleaning substrate in a particular location for a defined period of time before moving the substrate to a next section, or it may adjust the pressure applied to the substrate, or it may override a "device jam" alert and permit the media conveyors to turn even though the cleaning substrate is not moving through the machine in a normal mode of operation. Detection that the substrate is a cleaning substrate may occur by any suitable means, such as by manual input, by detecting a shape of the substrate, or by using image processing to detect a code or other identifying indicia that is printed on the substrate.

If the cleaning substrate includes scarifying holes, the scarifying holes may be aligned to rollers, belts, sensors and/or other selected components of the media transport device that are in the media travel pathway. If the cleaning substrate includes one more flaps for cleaning a belt, one or more belts may be positioned over or under the flap(s). The cleaning substrate may remain fully within the media travel pathway. Alternatively, a portion of the cleaning substrate may extend out from the media travel pathway, such as through a currency acceptor slot, so long as enough of the cleaning substrate remains within the pathway to provide a cleaning function. If opened, the portal to the first section will then be closed (step 803) so that at least some of the belts or rollers contact the first cleaning substrate.

A first section of the media transport device will thus receive the cleaning substrate through the portal, and the substrate will then be moved within the pathway (step 804) to clean various components of the pathway. For example, an operator may grasp a handle of the cleaning substrate, insert a body of the cleaning substrate into a portal of the media transport device, and jostle the handle to move the body through a range of positions within the pathway to cause the scarifying holes and/or belts of the body to clean the rollers, belts and/or other components of the pathway over the range of positions.

In addition, or alternatively, a motor of the media transport device may be operated so that the belts or rollers move, contact the first cleaning substrate and are cleaned while the first cleaning substrate is positioned within the first section of the media transport device (step 805). For example, while the cleaning substrate is in the first section, scarifying holes that align with the media conveyors (e.g., belts or rollers) may contact and clean the media conveyors while the media transport device is operated. The motors may be used to help move the substrate over a range of positions, or the motor may be operated to turn the belts or rollers while an operator grasps the handle and holds the substrate in a position or range of positions.

The device may then be turned off (i.e., powered down or moved to an idle mode in which the belts and rollers of the media travel pathway are not operated), and portal(s) will be opened to withdraw the cleaning substrate(s) from the media travel pathway (step 807) so that it may optionally be reinserted in a different position. Alternatively, if a portion of the substrate extends from the portal, the substrate may be withdrawn (step 807) via the handle.

Optionally, before opening the first section and placing the cleaning substrate through the portal, the method may include operating the media transport device and, while operating the motor, placing a second cleaning substrate (step 810) that includes a cleaning solution into a second portal that is accessible during operation of the motor so that the second cleaning card is received into, and moves through the media transport device, and the cleaning solution contacts the belts or rollers while the second cleaning substrate moves through the media transport device. In this way, cleaning solution may be applied to the media travel pathway before the stationary card is inserted, and the stationary card may then require little or no cleaning solution. This also may help pre-clean the components of the media travel pathway before the stationary cleaning substrates are inserted.

Optionally, after moving the substrate in the pathway (step 804) and/or operating the media transport device so that the belts or rollers turn, contact the first cleaning substrate and are cleaned (step 805), if a portal was opened to place the substrate in the pathway the method may include re-opening the portal to expose access to a section of media travel pathway and repositioning the cleaning substrate to a second position in the section according to a second alignment position (step 806). That portal may then be closed, and the substrate will again be moved, and/or the motor of the media transport device will be again operated, so that at least some of the belts or rollers contact the cleaning substrate and are further cleaned while the cleaning substrate is in the second position.

Alternatively, rather than powering down the device and opening the sections, operation of the media transport device may cause the cleaning substrate to move to a second section. If so, the media conveyors may move the cleaning substrate between the section as they do with currency. The scarifying holes, flaps and/or cleaning face of the cleaning substrate will then clean the media conveyors and other features of the second section. In this embodiment, if the media transport device is operating in a cleaning mode, it may move the device to the second section after a threshold period of time, or in response to a manual input, or when it detects that the cleaning substrate has achieved a threshold level of cleaning in the first section. Detection of the threshold level of cleaning may occur by using a camera to capturing images of the cleaning substrate and processing the images to determine when patterns associated with dirt appear at locations on the substrate that are expected to become dirty after cleaning. Optionally, the opacity or grayscale value of the markings in these areas may be monitored, and cleaning may be determined to have completed when a threshold opacity or grayscale level is achieved.

Figure 9:
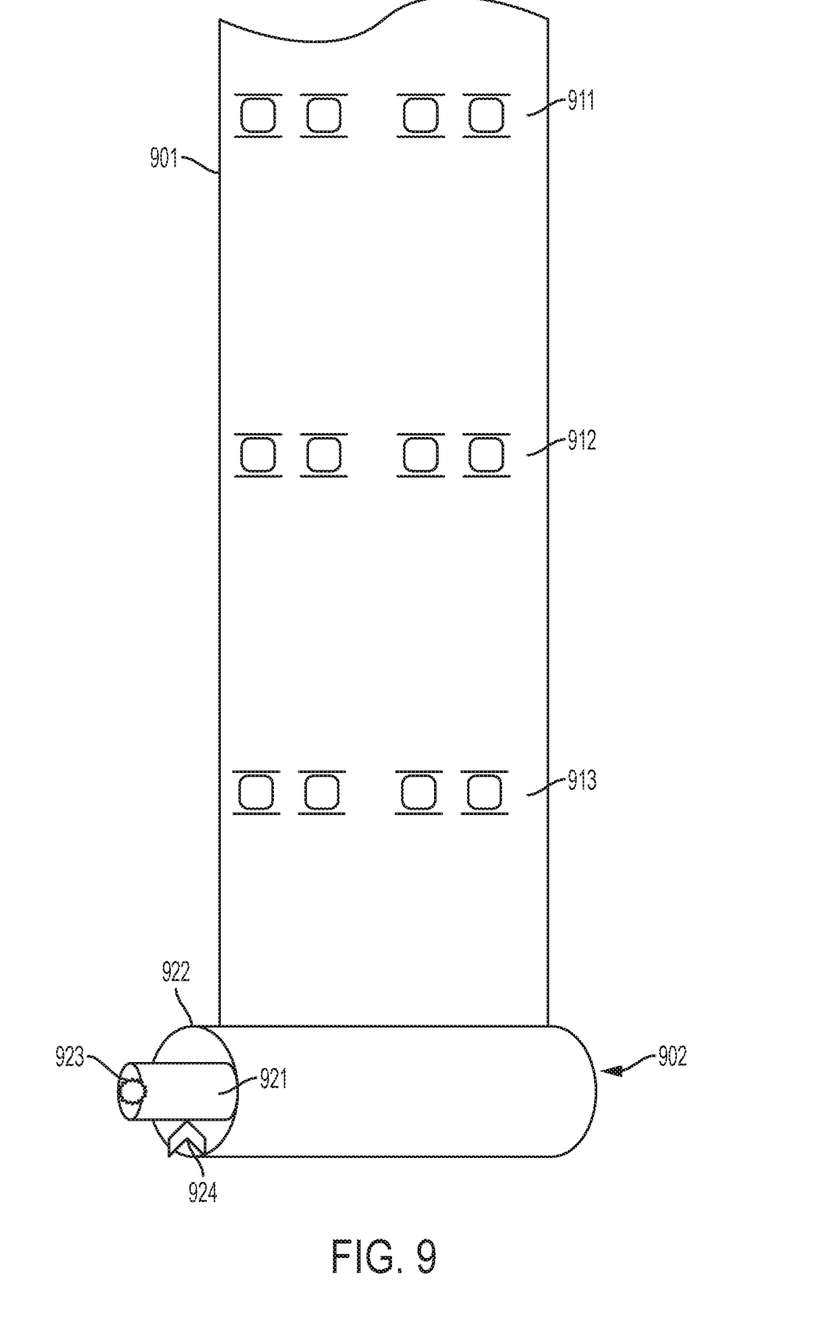
FIG. 9 illustrates an embodiment in which the cleaning substrate is attached to a scroll from which the substrate may be withdrawn, and into which the substrate may be retracted.

FIG. 9 illustrates that in any of the embodiments described above, the cleaning substrate 901 may be attached to a scroll 902. The cleaning substrate may include scarifying holes 911-913 that move through the device and clean various elements as the cleaning substrate is withdrawn from the scroll 902 and moved into the media transport device. The cleaning substrate 901 (which may include a cleaning face and/or a non-cleaning face of the substrate) may be wrapped around a roller 921 of the scroll and withdrawn from a housing 922 of the scroll through an opening in the housing 922. A retraction mechanism 923 such as a spring may create a force that causes the roller 921 to wind in a direction that will tend to withdraw the cleaning substrate 901 back into the housing 922 around the roller 921. A clutch 923 may hold the roller in place and prevent the roller 921 from withdrawing the cleaning substrate into the scroll until the clutch 924 is released. When cleaning is completed, the clutch 924 may be released, which will permit the cleaning substrate 901 to be retracted by the retraction mechanism 923 and wrapped around the roller 921 inside of the scroll housing 922. (FIG. 9 shows shapes representing the retraction mechanism and clutch as being outside of the housing, but this is for purposes of illustration only; these elements also may be positioned inside of the housing.)

The methods and systems described above may result in significant time savings as compared to manual cleaning. In addition, they can help ensure that cleaning occurs in small and/or hard-to-reach segments within the media transport device.

The features and functions described above, as well as alternatives, may be combined into many other different systems or applications. Various alternatives, modifications, variations or improvements may be made by those skilled in the art, each of which is also intended to be encompassed by the disclosed embodiments.

The invention claimed is:

1. A method of cleaning a media travel pathway of a media transport device, comprising:
   opening at least a first section of a media travel pathway of a media transport device that includes a plurality of media conveyors that comprise belts, rollers or both;
   inserting at least a portion of a cleaning substrate in the first section, wherein the cleaning substrate further comprises one or more flaps configured to fit under one or more belts of the media transport device; and
   moving the cleaning substrate within the media transport device and causing, by the moving, the cleaning substrate to contact and clean a plurality of the media conveyors within the first section of the media travel pathway of the media transport device.

2. The method of claim 1, wherein:
   inserting at least a portion of the cleaning substrate in the first section comprises grasping a handle of the cleaning substrate and inserting a body of the cleaning substrate into a portal of the media transport device; and
   moving the cleaning substrate within the media transport device comprises jostling the handle to move the body through a range of positions within the first section to cause the cleaning substrate to clean a plurality of the media conveyors over the range of positions.

3. The method of claim 1, wherein moving the cleaning substrate within the media transport device comprises operating a motor of the media transport device so that the cleaning substrate moves through a range of positions within the first section to cause the cleaning substrate to clean a plurality of the media conveyors over the range of positions.

4. The method of claim 1, wherein inserting at least a portion of the cleaning substrate in the first section comprises opening a module that forms the media travel pathway and inserting a cleaning surface of the cleaning substrate into the module while holding a handle of the cleaning substrate outside of the module.

5. The method of claim 1, wherein:
   the cleaning substrate is connected to a scroll, wherein the scroll comprises a roller around which the cleaning substrate is wound, a retraction mechanism and a clutch;
   moving the cleaning substrate within the media transport device comprises extending the cleaning substrate from the scroll; and
   the method further comprises withdrawing the cleaning substrate from the media transport device by releasing the clutch and retracting the cleaning substrate into the scroll.

6. The method of claim 1, wherein:
   the cleaning substrate includes a cleaning face and a plurality of scarifying holes, each of which is positioned to align with one or more of the media conveyors; and
   moving the cleaning substrate within the media transport device causes the scarifying holes to contact and clean the plurality of media conveyors within the first section of the media transport device.

7. The method of claim 6, wherein:
   the cleaning substrate further comprises one or more scrapers, each of which is attached to at least one edge of one of the scarifying holes and extends inwardly from the at least one edge toward the center of that scarifying hole; and
   moving the cleaning substrate within the media transport device also causes the one or more scrapers to contact and clean one or more of the media conveyors.

8. A method of cleaning a media travel pathway of a media transport device, comprising:
   operating a first section of a media travel pathway of a media transport device and a second section of the media transport device, wherein each section includes a plurality of media conveyors that comprise belts, rollers or both;
   opening the first section and inserting at least a portion of a cleaning substrate in the first section, wherein the cleaning substrate includes a cleaning face;
   continuing to operate the media transport device and causing, by the operating, the cleaning face to contact and clean a plurality of the media conveyors within the first section of the media transport device;
   by the media transport device, detecting that the cleaning substrate has achieved a threshold level of cleaning in the first section;
   by the media transport device, in response to the detecting, moving the cleaning substrate to the second section; and
   operating the media transport device and causing, by the operating, the cleaning face to contact and clean a plurality of the media conveyors within the second section of the media transport device.

9. The method of claim 8, further comprising:
   by the media transport device, detecting that the portion of the cleaning substrate was inserted into the first section; and
   in response to the detecting, initiating a cleaning mode of the media transport device so that the operating of the media transport device occurs in the cleaning mode.

10. The method of claim 8, wherein:
    the cleaning substrate is connected to a scroll, wherein the scroll comprises a roller around which the cleaning substrate is wound, a retraction mechanism and a clutch;
    when the media transport device is operated, the cleaning substrate is extended from the scroll; and
    when the media transport device is stopped and the clutch is released, the cleaning substrate is withdrawn from the media transport device and retracted into the scroll.

11. The method of claim 8, wherein moving the cleaning substrate within the media transport device comprises operating a motor of the media transport device so that the cleaning substrate moves through the first and second sections to cause the cleaning substrate to clean a plurality of the media conveyors in each of the first and second sections.

12. The method of claim 8 wherein:
    the cleaning substrate further comprises a plurality of scarifying holes;
    moving the cleaning substrate within the first section causes the scarifying holes to contact and clean the plurality of media conveyors within the first section of the media transport device; and
    moving the cleaning substrate within the second section causes the scarifying holes to contact and clean the plurality of media conveyors within the second section of the media transport device.

13. A method of cleaning a media travel pathway of a media transport device, comprising:
- opening a portal of a media transport device that includes a plurality of media conveyors that comprise belts, rollers or both, wherein the portal is not accessible during normal operation of the device;
- inserting at least a portion of a cleaning card through the portal and into a media travel pathway of the device, wherein the cleaning card includes a cleaning face; and
- moving the cleaning card within the media travel pathway and causing, by the moving, the cleaning substrate to contact and clean a plurality of the media conveyors within the media travel pathway.

14. The method of claim 13, wherein the cleaning card remains fully within the media travel pathway during the cleaning.

15. The method of claim 13, wherein:
- inserting at least a portion of the cleaning card through the portal comprises grasping a handle of the cleaning card and inserting a body of the cleaning card into the portal; and
- moving the cleaning card within the media travel pathway comprises jostling the handle to move the body through a range of positions within the media travel pathway.

16. The method of claim 13, wherein:
- the cleaning card comprises one or more inwardly-facing flaps configured to fit under one or more belts of the media transport device;
- inserting at least a portion of the cleaning card into the media travel pathway comprises positioning a belt of the media travel pathway under one or more of the flaps; and
- moving the cleaning substrate within the media transport device causes the one or more flaps to contact and clean the belt.

17. The method of claim 13 wherein:
- the cleaning card comprises a plurality of scarifying holes;
- inserting at least a portion of the cleaning card into the media travel pathway comprises aligning the scarifying holes with media conveyors in the media travel pathway; and
- moving the cleaning substrate within the media travel pathway causes the scarifying holes to contact and clean the plurality of media conveyors within the media travel pathway; and
- moving the cleaning substrate within the first section causes the scarifying holes to contact and clean the plurality of media conveyors within the media travel pathway.

18. The method of claim 13, wherein moving the cleaning card within the media travel pathway comprises:
- holding the cleaning card in a particular location of the media travel pathway for a defined period of time; and
- moving the cleaning card to a next section of the media travel pathway to clean the next section.

19. The method of claim 13, wherein:
- the cleaning card is connected to a scroll that comprises a roller around which the cleaning substrate is wound;
- inserting at least a portion of the cleaning card through the portal comprises extending the cleaning substrate from the scroll; and
- the method further comprises withdrawing the cleaning card from the media travel pathway and retracting the cleaning card into the scroll.

20. The method of claim 13, wherein:
- the cleaning card includes a cleaning face and an opposing face; and
- the cleaning face is coated with a cleaning solution.

21. A method of cleaning a media travel pathway of a media transport device, the method comprising:
- opening at least a first section of a media travel pathway of a media transport device that includes a plurality of media conveyors that comprise belts, rollers or both;
- inserting at least a portion of a cleaning substrate in the first section, wherein:
  - the cleaning substrate includes a cleaning face and a plurality of scarifying holes, each of which is positioned to align with one or more of the media conveyors, and
  - the cleaning substrate further comprises one or more scrapers, each of which is attached to at least one edge of one of the scarifying holes and extends inwardly from the at least one edge toward the center of that scarifying hole; and
- moving the cleaning substrate within the media transport device and, by the moving:
  - causing the scarifying holes to contact and clean the plurality of media conveyors within the first section, and
  - causing the one or more scrapers to contact and clean one or more of the media conveyors.

22. The method of claim 21, wherein:
- inserting at least a portion of the cleaning substrate in the first section comprises grasping a handle of the cleaning substrate and inserting a body of the cleaning substrate into a portal of the media transport device; and
- moving the cleaning substrate within the media transport device also comprises jostling the handle to move the body through a range of positions within the first section to cause the cleaning substrate to clean a plurality of the media conveyors over the range of positions.

23. The method of claim 21, wherein moving the cleaning substrate within the media transport device also comprises operating a motor of the media transport device so that the cleaning substrate moves through a range of positions within the first section to cause the cleaning substrate to clean a plurality of the media conveyors over the range of positions.

24. The method of claim 21, wherein inserting at least a portion of the cleaning substrate in the first section comprises opening a module that forms the media travel pathway and inserting a cleaning surface of the cleaning substrate into the module while holding a handle of the cleaning substrate outside of the module.

25. The method of claim 21, wherein:
- the cleaning substrate is connected to a scroll, wherein the scroll comprises a roller around which the cleaning substrate is wound, a retraction mechanism and a clutch;
- moving the cleaning substrate within the media transport device also comprises extending the cleaning substrate from the scroll; and
- the method further comprises withdrawing the cleaning substrate from the media travel pathway by releasing the clutch and retracting the cleaning substrate into the scroll.

26. A method of cleaning a media travel pathway of a media transport device, the method comprising:
- opening at least a first section of a media travel pathway of a media transport device that includes a plurality of media conveyors that comprise belts, rollers or both;

inserting at least a portion of a cleaning substrate in the first section, wherein the inserting includes grasping a handle of the cleaning substrate and inserting a body of the cleaning substrate into a portal of the media transport device; and moving the cleaning substrate within the media transport device by jostling the handle to move the body through a range of positions within the first section; and causing, by the moving, the cleaning substrate to contact and clean a plurality of the media conveyors over the range of positions within the first section.

27. The method of claim 26, wherein inserting at least a portion of the cleaning substrate in the first section comprises opening a module that forms the media travel pathway and inserting a cleaning surface of the cleaning substrate into the module while holding the handle outside of the module.

\* \* \* \* \*